Feb. 23, 1971  P. E. NIMOCKS  3,565,720
PROCESS FOR PRODUCING A SIMULATED ANTIQUE CRAZED FINISH
Filed Feb. 4, 1969

*INVENTOR.*
PATRICIA E. NIMOCKS
BY
ATTORNEY

United States Patent Office 3,565,720
Patented Feb. 23, 1971

3,565,720
PROCESS FOR PRODUCING A SIMULATED ANTIQUE CRAZED FINISH
Patricia E. Nimocks, Anchorage, Ky., assignor to Connoisseur Studio, Inc., Middletown, Ky., a corporation of Kentucky
Filed Feb. 4, 1969, Ser. No. 796,496
Int. Cl. B44d 5/00; C09d 5/28
U.S. Cl. 156—237                                                    13 Claims

ABSTRACT OF THE DISCLOSURE

Discloses a method and means for producing a simulated, crazed, antique finish on a painting, a dye transfer image, or household item. The process involves coating of the article to be treated with an aqueous emulsion of a high molecular weight polymer resin and thereafter coating the polymeric film produced thereby with an aqueous paste of starch. The coating of starch paste is then treated with an oil stain which fills the cracks caused by drying of the starch and penetrates the film of high molecular resin to develop the simulated crazed finish on the film. After the stain has dried, the starch may be coated with a waterproof protective coating, such as varnish or lacquer.

FIELD OF THE INVENTION

This invention relates to the production of a simulated crazed antique finish over a high molecular weight polymer resin film. In one embodiment, the high molecular weight resin film might be the film produced by acrylic polymer paint or it may be produced by coating the object or image to be treated with an aqueous emulsion of a high molecular weight film forming resin. More specifically, this invention relates to a method and means of forming a simulated, crazed network on a high molecular weight film so as to produce a simulated antique finish on the surface on which the high molecular weight polymer film is coated. This invention is applicable to the production of simulated crazed finishes on paintings, prints and images and in the production of simulated crackleware finishes on vases, pitchers and other household items.

DESCRIPTION OF THE PRIOR ART

Crackling is a flaw. Paints and varnishes shrink and crack with age. The development of cracks in oil paintings due to the different rates of shrinkage of the various layers of paint has long been associated with fine oil master paintings. Further, even durable pottery glazes have delayed crazing and produce a crackle finish in glazed pottery, classified as "crackleware." For years, there has been a concerted effort to produce an industrial finish for metallic and other substrates embodying a controllable texturing effect. Generally, such finishes, designated as "wrinkle finishes," include the "textured" enamels in contrast to orthodox plane finishes. These finishes form an uneven surface of regular pattern upon baking. They are also known as "crinkled," "shriveled," "rippled" and "suede" finishes and belong to a class of novelty finishes which include crystal and crystallizing enamels, crystallizing lacquers and hammer finishes.

One explanation which has been offered for the wrinkling and texturing of these oleoresinous films is that the underlying portion of the film is comparatively fluid, whereas the surface is rapidly oxidized to the solid stage, thus setting up strains within the film which results in wrinkling. Sward, Geo. G. National Paint Varnish Lacquer Assoc., Circ. 518, 257–270 (1936) has given a brief but adequate review of early patent literature relative to the textured finishes. Patents for these type finishes include: Agnew, 1,980,309; Bradley, 1,893,611; Breydon, 2,048,-632; Burgman, 1,934,034; Glidden 1,001,585; Hadfield et al. (British) 109657; Kittredge et al. 2,037,331, 2,069,252, 2,077,112; Kittredge, 2,124,703); Moore, 2,-154,954 (British patent) 521,400; Phillippi, 1,878,316, 1,936,913; Root, 1,689,892, 1,732,661, 1,831,323, 1,864,-763, 1,833,408, 1,896,594, 1,950,417, 1,976,191 1,954,-835; and Toll, 1,969,164, 1,991,527, 1,991,528.

More recently, a process for transferring multicolored designs and images from one substrate to another through the use of high molecular weight resin polymers has been disclosed in U.S. Pat. 2,810,673 to Wooldrik and U.S. Pat. 3,334,003 to Fletcher G. Edwards.

Wooldrik disclosed, as a transfer emulsion, a broad classification of high molecular weight polymeric resins including polyvinyl resins, polyacrylic resins and certain other thermoplastic resins whereas Edwards proposed only the use of the polyacrylic resins. Further, there has been introduced into the market a so-called "polymer" paint made of a water emulsion of acrylic polymer and produced under the trade name of Hyplar by M. Grumbacher, Inc.

SUMMARY OF THE INVENTION

While it is obvious from the above review of the prior art, that many textured finishes have been introduced in the paint and varnish field, for industrial uses, until now there has been no method of producing a controlled, crazed antique simulated finish on art objects for the home hobbyist. Further while crazing due to age and varying rates of shrinking in oil masterpieces is well known, insofar as I am aware, there has not been a method whereby the home artisan could reproduce a crazed or crackled effect on a facsimile of an old oil painting.

According to my invention, a controlled, crazed antique simulated finish may be formed on a coated surface. The surface is coated with a high molecular weight polymeric film forming resin as, for example, an aqueous emulsion of an acrylic polymer or an aqueous emulsion of vinyl polymer or water base emulsions of other latices.

A coating of a starch paste over the dried film of high molecular weight resin forms a fine crazed network simulating the natural antique crackled effect found in crackleware pottery finishes and in aged museum masterpieces. Application of an oil stain over the coating of starch paste allows the stain to penetrate through the network of cracks and thus stain the high molecular weight resin film so as to develop the simulated crazed network on the film. Excess stain is wiped from the plane uncracked surfaces of the coating of dried paste, and the stain remaining in the cracks is allowed to dry and penetrate the underlying film to develop the simulated crazed network. This darkens and antiques the plane surfaces of the paste coating and provides texture to the finish. This dried and textured finish is then protected with a waterproof coating of varnish or lacquer.

In another embodiment the starch paste may be removed after the stain has dried in the cracks. In this case it is not necessary to apply the protective coating of waterproof varnish.

In still another embodiment, the film containing the network of cracks can then be recoated with another coating of starch paste, which, when dry, can be restained with a contrasting color oil stain to form a second crazed network of cracks superimposed over the cracks formed by the first starch coating and the entire antiqued and textured finish may then be protected with a protective coating of waterproof varnish or lacquer.

DESCRIPTION OF THE PREFERRED EMBODIMENT

Figure 1:
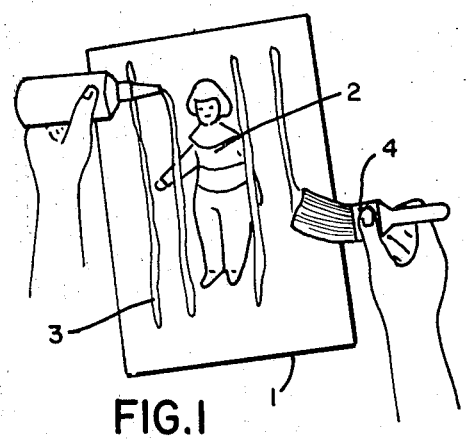
FIG. 1 is a view in perspective of a printed image on a paper backing and a coating of a high molecular weight polymer resin being applied thereto.

In the hobbycraft industry, there has been introduced high molecular weight, polymer film forming resins, both in the forms of "polymer paint" and in the forms of transfer emulsions. The polymer paint allows the production of paintings of oil paint quality which, however, dry within a few minutes, which are pliable when dry and in which the brushes and spills may easily be cleaned up with soap and water. An example of such a paint is presently being marketed by M. Grumbacher under the trade name "Hyplar." Additionally, as disclosed by Wooldrik in U.S. Pat. 2,810,673 and by Edwards in U.S. Pat. 3,334,003, a large variety of high molecular weight film forming resins in water base emulsions have been found to be useful in dye stripping an image from a paper backing for transfer to a second substrate. In the case of Wooldrik, for example, the polyacrylic resin is painted onto a canvas and the print containing the image is pressed into contact with the dried canvas by passing same through a heated calender so as to transfer the ink from the print onto the canvas.

In the Edwards disclosure, polyacrylic resins in water base emulsions are utilized to coat the lithograph or print and by selective adsorption dye strip or transfer the ink from the print to the resin film which can then be stripped from the paper backing after emersion in heated water. Thus the film containing the multicolored image can then be applied to a canvas, to wood, or to household objects to produce an object d'art.

According to this invention, a textured, crazed and antiqued finish is produced on such high molecular weight polymer film through the application of a starch paste which exhibits good adhesive properties on such film but poor cohesion so as to develop a network of cracks or crazemarks which are essentially invisible until developed by application of a penetrating oil stain which penetrates through the cracks to the film below.

Some consideration may be given to the various high molecular weight film forming resins suitable for use in this application. Thus, for example, according to Edwards, the film forming resin is a water emulsion of an acrylic polymer. The emulsion should have a solid contents of between 40–60% dispersed in water. In appearance, the coating liquid is white and milky. The molecular weight of a typical acrylic polymer is about $1.25 \times 10^6$. According to Wooldrik not only acrylic polymers can be used but also polyvinyl resins and various other latices. The polymer material in the latices have high molecular weight. Therefore, they are nonpenetrating on porous surfaces. They are relatively hard and have high cohesive strength. Normally, the latices are the result of emulsion polymerization of polymeric materials. Like all colloidal systems, the latices must be used with care to prevent breaking the emulsion or coagulating the dispersed phase. When part of the water has evaporated, the emulsion breaks and the remainder of the water evaporates rapidly, leaving a dry film. Suitable systems include styrene-butadiene; vinyl chloride-vinylidene chloride copolymer, the butadiene-acrylonitrils copolymers; polyvinyl acetate (both homo and copolymers), and the polyacrylic copolymers.

Characteristics of these films are the high cohesive strength and pliability of the film by itself or on the substrate. Thus, for example, the entire film may be stripped from a print having a paper backing and the image transferred onto the film for mounting onto another substrate as taught by Edwards. Further, the polymer paints have the outstanding characteristic of being pliable so that finished canvasses can be rolled without damage to the painting.

On such surfaces, then, a starch paste is added to produce a network of cracks simulating an antique, crazed, crackle finish. The starch paste, exhibits good adhesive strength onto the high molecular weight polymer film but poor cohesive strength, thus forming a network of cracks upon drying. Some consideration might be given to the character of the starch paste. Starch paste is formed by addition of heat and water which cause the cell walls of the starch to rupture, thus liberating starch granules as a paste. Apparently, the wall thickness of the cells containing starch granules varies in its structure, due perhaps to the physical structure or chemical composition. In any event, on being heated in water, the granules swell and gelatinize, forming a viscous paste. Starch granules swell progressively in water as the temperature is raised in the range of 60–70 degrees centigrade and above this temperature level, the granules gelatinize to form a paste or solid. With gelatinization, there is loss of birefringence, a disintegration of the granule and formation of either a paste gel or sol, depending on the origin and concentration of the starch present. In general, small granules gelatinize more slowly and at high temperatures than large granules. However, the temperature of gelatinization is a function of pH. The temperatures for the cell structures vary from 55°–85° but are quite constant for a specific kind of starch. Thus, for example, the heat of gelatinization varies from 5700 cal./glucose unit for the small rice granules to 9080 cal./glucose units for the relatively large potato starch granule. Of the colloidal characteristics of starch in aqueous dispersion or solution, clarity, color, viscosity and flow properties, gel strength, adhesive strength and film properties are the most important. Water is normally used in the ratio of about 6–1 by weight to form a free flowing slurry. When gelatinization starts, a free flowing liquid results, usually being treated with about 3% caustic soda. However, caustic alkalies and organic bases, as for example, ethylene diamine, and other dispersing agents are solvents for starch at lower temperatures.

Referring now to the drawings, FIG. 1 illustrates an operator applying a coating of a high molecular weight acrylic water base emulsion 3 to an image 2 on a paper backing 1 by means of brush 4. Normally, several coats of the water base emulsion 3 are applied to the paper backing 1 and the entire coated paper back image is allowed to cure. After curing for about 6 hours, the coated paper back image is placed into a water pan 5 containing hot water and the matter is allowed to soak until the paper backing 1 can be removed from the film 3f to which the image 2 has now been transferred. The image is then coated with another coating of the water base emulsion of acrylic polymer and applied to canvas or canvasboard 8 by means of a roller or brayer 7.

Figure 2:
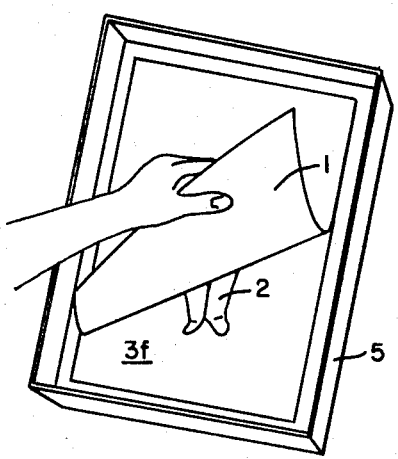
FIG. 2 is a view in perspective of the coated paper backed image, illustrated in FIG. 1 immersed in water so as to soak the paper backing from the high molecular weight film.
Figure 3:
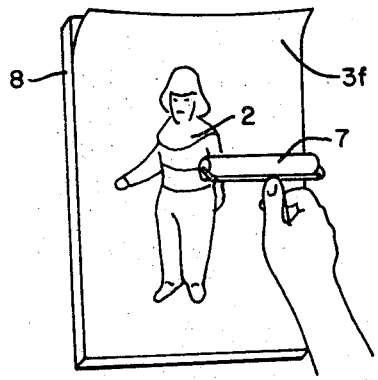
FIG. 3 illustrates the high molecular weight polymer film, bearing the transferred image, being mounted on canvas or other substrate.
Figure 4:
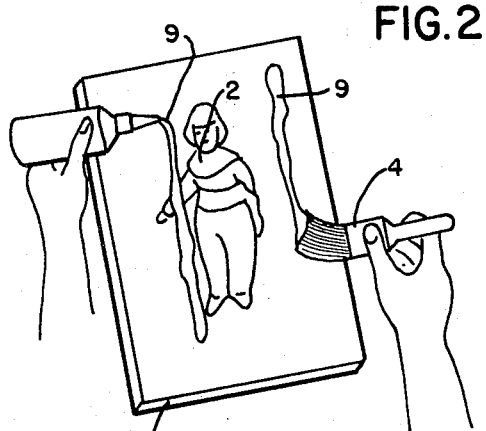
FIG. 4 is a view in perspective of a coating of starch paste being applied onto the film and the transferred image.
Figure 5:
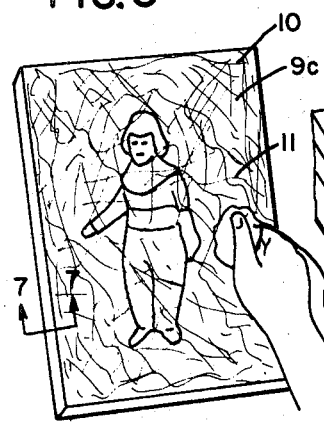
FIG. 5 illustrates the application of stain to the dried starch paste coating in order to develop the crazed pattern.

The first three steps illustrated in FIGS. 1–3 are essentially those disclosed in U.S. patent to Edwards, 3,334,003. Now as shown in FIG. 4, a waterbase paste of starch 9 is brushed onto the dried film 3f containing the transferred image 2 by means of brush 4. As the starch dries, a fine network of cracks 10 develop throughout due to the poor cohesive qualities of the starch paste. The dried starch paste coat 9c is then rubbed with an oil penetrating stain 11 and the excess oil stain is wiped off of the plane uncracked starch paste surface 9c by means of a cloth 12.

Figures 6, 7:
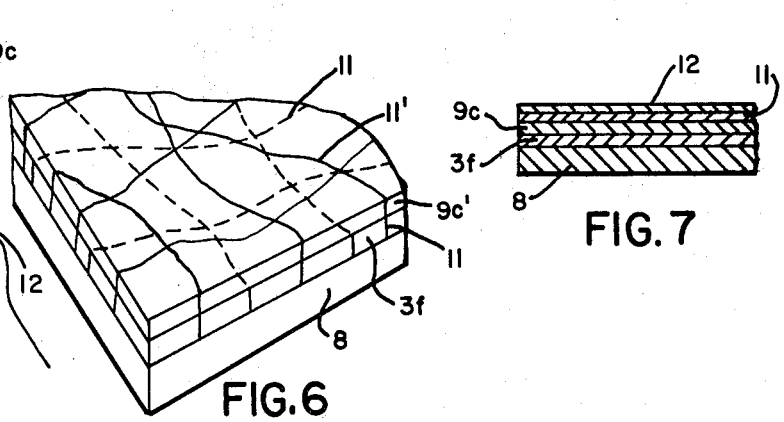
FIG. 6 is a fragment in perspective, illustrating the various layers previously illustrated in FIG. 1, FIG. 4, and FIG. 5.
FIG. 7 is a sectional view, taken along lines 7—7 of FIG. 5, illustrating the layers constituting the simulated antique finish.

After the stain has dried, having penetrated on through the starch paste coating 9c, so as to penetrate the acrylic film 3f, the starch paste may be removed and another coating of starch paste applied—which when dried, is designated in FIG. 6 as 9c'. The cracks formed upon the shrinkage of the starch paste in the dried coating 9c' forms another set of cracks superimposed on the first simulated crazed network and a subsequent coating of oil stain 11' of contrasting color, penetrates through the cracks and is superimposed over the oil stain forming the simulated crazed network 11 on the film 3f.

As is illustrated in FIG. 7, a layer of varnish over the layer of oil stain 11 protects the dried starch paste coating 9c from moisture and produces a textured and crazed antique effect on the canvasboard backing 8.

Figure 8:
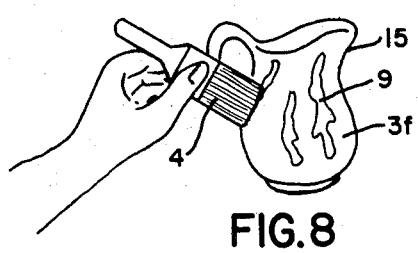
FIG. 8 is a side elevation of a pitcher to which a coating of the starch paste is being applied.
Figure 9:
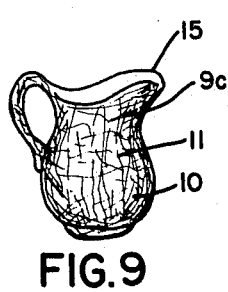
FIG. 9 is a side elevation of the treated pitcher, illustrating the finished textured and crackled finish.

As previously mentioned, this invention is not limited to the production of a simulated antique effect on the transferred images on an acrylic film, but may be utilized to produce a crackleware effect on pottery, such as the pitcher 15 shown in FIG. 8. In this figure, an operator is brushing a water base starch paste 9 onto the pitcher 15 by means of brush 4. The pitcher 15 had previously been coated with an emulsion of a high molecular weight resin which dried to form film 3f. The starch paste 9 is applied over the dried film 3f as previously illustrated and the dried starch paste 9c shrinks to form a network of cracks 10 to which a penetrating oil stain 11 is applied to penetrate through the cracks 10 to the film 3f, covering the pitcher. Again, the entire surface is protected with a coating of varnish or lacquer. As previously indicated, if desired, the coat 9c of starch may be removed after the oil stain 11 has penetrated into the film of acrylic resin 3f to develop the crazed appearance and a second coat of water base starch paste 9' applied, which when dried, is treated with a contrasting color oil stain to superimpose a second network of cracks over the first. A fine network of cracks is formed generally with a fine thin layer of starch paste. Secondly, the character of the cracks is affected by the humidity and speed of drying. Further, the character of the crazed network is affected to some extent by the substrate to which the waterbase starch paste is applied. Generally speaking, a heavy coat of waterbase starch paste produces heavy well defined cracks, whereas a thin coat of waterbase starch paste produces a fine network of fine cracks.

I claim:

1. A process of producing a simulated antique crazed finish, which comprises the steps of:
   (a) coating a pliable film of a high molecular weight film forming resin with an aqueous starch paste;
   (b) drying the coat of said starch paste to form a dry coating containing a network of cracks;
   (c) applying an oil stain to said dry coating and rubbing said stain into said network of cracks so as to penetrate to said film and form a simulated network of cracks in said film;
   (d) drying said oil stain.

2. A process of producing a simulated antique crazed finish, as defined in claim 1, in which:
   (a) said pliable film of a high molecular weight resin is obtained by the steps of:
      (1) applying a coat of a high molecular weight film forming resin to a surface;
      (2) allowing said coat of high molecular weight film forming resin to dry.

3. A process of producing a simulated antique crazed finish, as defined in claim 2, in which said surface to which said high molecular weight film forming resin is applied is paper containing a water insoluble nonbleeding image.

4. A process of producing a simulated antique crazed finish, as defined in claim 3, the further steps of:
   (a) soaking said paper backing and said film in water;
   (b) peeling the wet paper from said film and said image;
   (c) coating the side of said coated image that formerly was next to said paper with a coat of a high molecular weight film forming resin;
   (d) applying the coated image to a second backing while the second coating of said high molecular weight film forming resin is still wet, and drying said second coating to adhesively secure said film to said second backing.

5. A process for producing a simulated antique finish, as defined in claim 1, in which said high molecular weight, film forming resin is a water emulsion of an acrylic polymer.

6. A process of producing a simulated antique crazed finish, as defined in claim 1, the further step of applying a transparent waterproof coating over said dry coating and said simulated network of cracks.

7. A process of producing a simulated antique crazed finish as defined in claim 1, the further step of:
   (a) removing said dry coating of starch after said oil stain has dried.

8. A process of producing a simulated antique crazed finish, as defined in claim 7, which comprises the additional steps of:
   (a) applying a second coat of aqueous starch paste over said dried stain;
   (b) drying said second coat of starch paste to form a dry coating containing a second network of cracks;
   (c) applying an oil stain to said dry coating and rubbing said stain into said second network of cracks on said film;
   (d) drying said oil stain.

9. A process of producing a simulated antique crazed finish, as defined in claim 8, in which said second coat of oil stain is of contrasting color to said first coat of oil stain.

10. A simulated antique crazed finish, which comprises:
    (a) a pliable film of a high molecular weight resin;
    (b) a dried coating of an aqueous starch paste on said pliable film, said coating in dried condition containing a network of cracks;
    (c) an oil stain in said network of cracks and penetrating into said pliable film to form a simulated antique crazed finish on said film.

11. A simulated antique crazed finish, as defined in claim 10 in which:
    (a) said pliable film of a high molecular weight resin contains a water insoluble and nonbleeding image.

12. A simulated antique crazed finish, as defined in claim 10, in which said pliable film of a high molecular weight resin polymer is a dried coating of a water emulsion of an acrylic polymer.

13. A simulated antique crazed finish, as defined in claim 10, in which said pliable film of a high molecular weight resin polymer is a water emulsion of a vinyl polymer.

References Cited

UNITED STATES PATENTS

| | | | |
|---|---|---|---|
| 3,334,003 | 8/1967 | Edwards | 156—235 |
| 2,021,152 | 10/1935 | Neuhaus | 117—41 |
| 1,711,330 | 4/1929 | Simon | 117—41 |

ALFRED L. LEAVITT, Primary Examiner

M. F. ESPOSITO, Assistant Examiner

U.S. Cl. X.R.

117—5.5, 8, 41, 45, 165